H. H. MUGGLEY.
DIFFERENTIAL CAR WHEEL.
APPLICATION FILED OCT. 31, 1913.

1,108,867.

Patented Aug. 25, 1914.

WITNESSES:
Ok. A. Stock
S. Constine.

INVENTOR.
Henry Hubert Muggley
BY
Wm F. Booth
ATTORNEY.

UNITED STATES PATENT OFFICE.

HENRY HUBERT MUGGLEY, OF SAN FRANCISCO, CALIFORNIA.

DIFFERENTIAL CAR-WHEEL.

1,108,867.          Specification of Letters Patent.      Patented Aug. 25, 1914.

Application filed October 31, 1913. Serial No. 798,457.

*To all whom it may concern:*

Be it known that I, HENRY HUBERT MUGGLEY, a citizen of the United States, residing in the city and county of San Francisco and State of California, have invented certain new and useful Improvements in Differential Car-Wheels, of which the following is a specification.

My invention relates to car-wheels capable of differential rotation.

The object of my invention is to provide a simple and effective car-wheel of this type, which is readily applicable to wheels and axles already in use as well as to original construction.

To this end my invention consists in the novel differential car-wheel which I shall now fully describe, by reference to the accompanying drawings, in which—

Figure 1:
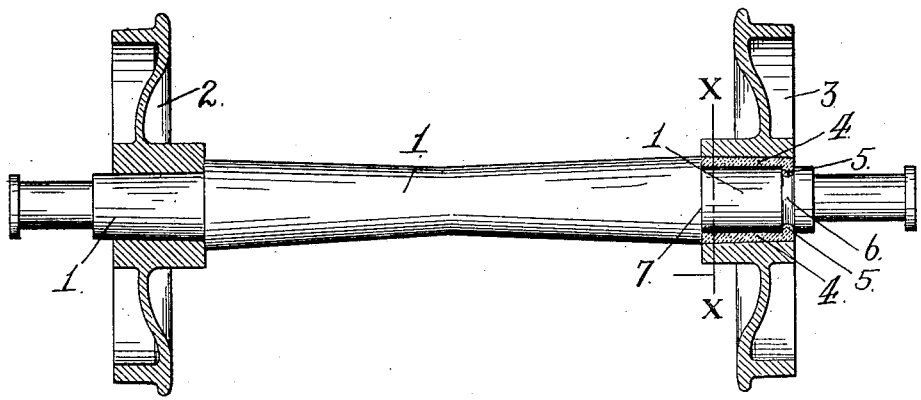
Figure 3:
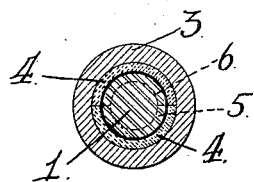
Figure 2:
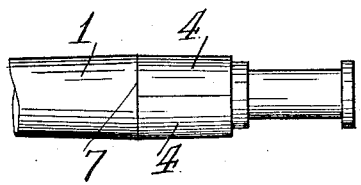

Figure 1 is a vertical sectional view, the axle between the wheels being in elevation. Fig. 2 is an elevation of one end of the axle, showing the sectional bushing, the wheel being removed. Fig. 3 is a section on the line $x$—$x$ of Fig. 1.

1 is the car-axle.

2 is one wheel, fast on the axle in the usual manner. 3 is the other wheel. This wheel is fast on a bushing 4, which is rotatively mounted on the axle, that is to say, the wheel has a pressed-fit on the bushing, and the bushing has a running-fit on the axle. The bushing is a sectional one, preferably two sections, in order to fit it to place. It is locked against end movement by means of an inwardly projecting annular flange 5 formed on its outer end, which flange fits a circumferential groove 6 in the axle. The inner end of the bushing seats against a shoulder 7 on the axle.

In adapting this construction to existing wheels and axles, it is only necessary to bore out the wheel center to a diameter sufficient to fit over the bushing, and to turn the groove 6 in the axle.

By this invention the wheel 3 has the necessary independence of rotation free of the axle, to provide for that difference in the revolution of the two wheels which this general type of device is intended to secure, namely, the turning of curves without slipping or climbing.

I claim:—

1. In a differential car-wheel, the combination of an axle; a bushing rotatably fitted on the axle; a wheel fast on the bushing; and interengaging instrumentalities between the bushing and axle to lock the rotatable bushing against end movement, consisting of an inwardly projecting annular flange on the bushing and a circumferential groove in the axle in which said flange rotates.

2. In a differential car-wheel, the combination of an axle; a bushing rotatably fitted on the axle; a wheel fast on the bushing; and interengaging instrumentalities between the bushing and axle to lock the bushing against end movement, consisting of an inwardly projecting annular flange on the bushing, a circumferential groove in the axle in which said flange rotates, and a circumferential shoulder on the axle against which the inner end of the bushing is seated.

3. Differential car-wheels comprising an axle; a wheel fast on said axle; an opposing wheel; a bushing upon which said opposing wheel is fast, said bushing having a running fit on the axle adapting it for rotation thereon; and interengaging instrumentalities between the bushing and axle to lock the rotatable bushing against end movement, consisting of an inwardly projecting annular flange on the bushing and a circumferential groove in the axle in which said flange rotates.

4. Differential car-wheels comprising an axle; a wheel fast on said axle; an opposing wheel; a bushing upon which said opposing wheel is fast, said bushing having a running fit on the axle adapting it for rotation thereon; and interengaging instrumentalities between the bushing and axle to lock the rotatable bushing against end movement, consisting of an inwardly projecting annular flange on the bushing, a circumferential groove in the axle in which said flange rotates, and a circumferential shoulder on the axle against which the inner end of the bushing is seated.

In testimony whereof I have signed my name to this specification in the presence of two subscribing witnesses.

HENRY HUBERT MUGGLEY.

Witnesses:
  WM. F. BOOTH,
  D. B. RICHARDS.